United States Patent
Haritaoglu et al.

(10) Patent No.: US 10,750,216 B1
(45) Date of Patent: Aug. 18, 2020

(54) METHOD AND APPARATUS FOR PROVIDING PEER-TO-PEER CONTENT DELIVERY

(71) Applicant: Google Inc., Mountain View, CA (US)

(72) Inventors: Ismail R. Haritaoglu, Palo Alto, CA (US); Oztan Harmanci, Mountain View, CA (US); Cihat Goktug Gurler, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/591,005

(22) Filed: May 9, 2017

Related U.S. Application Data (60) Provisional application No. 62/334,163, filed on May 10, 2016.

(51) Int. Cl.
| | |
|---|---|
| *H04N 21/238* | (2011.01) |
| *H04L 29/08* | (2006.01) |
| *H04L 29/06* | (2006.01) |
| *H04N 21/442* | (2011.01) |

(52) U.S. Cl.
CPC ....... *H04N 21/238* (2013.01); *H04L 65/4084* (2013.01); *H04L 67/06* (2013.01); *H04L 67/1085* (2013.01); *H04L 67/1097* (2013.01); *H04L 67/288* (2013.01); *H04N 21/44209* (2013.01)

(58) Field of Classification Search
CPC ............ H04N 21/238; H04N 21/44209; H04L 65/4084; H04L 67/06; H04L 67/1085; H04L 67/1097; H04L 67/288
See application file for complete search history.

(56) References Cited

U.S. PATENT DOCUMENTS

| | | | |
|---|---|---|---|
| 5,513,260 | A | 4/1996 | Ryan |
| 5,577,135 | A | 11/1996 | Grajski et al. |
| 5,659,613 | A | 8/1997 | Copeland et al. |
| 5,668,603 | A | 9/1997 | Copeland |
| 5,721,788 | A | 2/1998 | Powell et al. |
| 5,883,959 | A | 3/1999 | Kori |

(Continued)

FOREIGN PATENT DOCUMENTS

| | | |
|---|---|---|
| CN | 101325687 A | 12/2008 |
| CN | 101589617 A | 11/2009 |

(Continued)

OTHER PUBLICATIONS

D. G. Lowe, "Object Recognition from Local Scale-Invariant Features", in International Conference on Computer Vision, vol. 2, 1999, pp. 1-8.

(Continued)

*Primary Examiner* — John R Schnurr
(74) *Attorney, Agent, or Firm* — Lowenstein Sandler LLP (57) ABSTRACT

A computer implemented method embodied in a computer program stored in non-transient memory and executed by a computer processor for providing peer to peer content delivery of a live video stream includes delaying delivery of a live stream to a second client to serve that client from a first client that has previously received the live stream. The computer implemented method may further include switching between bad content sources (first clients) to good content sources based on heuristics.

9 Claims, 3 Drawing Sheets

(56) References Cited

U.S. PATENT DOCUMENTS

| | | | |
|---|---|---|---|
| 5,917,943 A | 6/1999 | Washizawa | |
| 6,018,374 A | 1/2000 | Wrobleski | |
| 6,026,189 A | 2/2000 | Greenspan | |
| 6,173,275 B1 | 1/2001 | Caid et al. | |
| 6,373,960 B1 | 4/2002 | Conover et al. | |
| 6,381,367 B1 | 4/2002 | Ryan | |
| 6,404,925 B1 | 6/2002 | Foote et al. | |
| 6,438,275 B1 | 8/2002 | Martins et al. | |
| 6,539,395 B1 | 3/2003 | Gjerdingen et al. | |
| 6,711,293 B1 | 3/2004 | Lowe | |
| 6,774,917 B1 | 8/2004 | Foote et al. | |
| 6,785,815 B1 | 8/2004 | Serret-Avila et al. | |
| 6,937,766 B1 | 8/2005 | Wilf et al. | |
| 6,975,746 B2 | 12/2005 | Davis et al. | |
| 6,975,755 B1 | 12/2005 | Baumberg | |
| 7,043,019 B2 | 5/2006 | Tehranchi et al. | |
| 7,055,169 B2 | 5/2006 | Delpuch et al. | |
| 7,167,574 B2 | 1/2007 | Kim | |
| 7,177,470 B2 | 2/2007 | Jasinschi et al. | |
| 7,185,201 B2 | 2/2007 | Rhoads et al. | |
| 7,218,754 B2 | 5/2007 | Schumann et al. | |
| 7,272,240 B2 | 9/2007 | Goldberg et al. | |
| 7,298,930 B1 | 11/2007 | Erol et al. | |
| 7,325,013 B2 | 1/2008 | Caruso | |
| 7,421,376 B1 | 9/2008 | Caruso et al. | |
| 8,160,366 B2 | 4/2012 | Nakamura et al. | |
| 8,200,021 B2 | 6/2012 | Iwamoto et al. | |
| 8,515,212 B1 | 8/2013 | Bengio et al. | |
| 8,515,241 B2 | 8/2013 | Forsyth et al. | |
| 8,607,283 B2 | 12/2013 | Civanlar et al. | |
| 8,677,428 B2 | 3/2014 | Lewis et al. | |
| 8,887,215 B2 | 11/2014 | Fisher et al. | |
| 8,943,215 B2 * | 1/2015 | Patten | H04L 67/108 709/231 |
| 9,015,151 B1 | 4/2015 | Margulis et al. | |
| 9,066,115 B1 | 6/2015 | Cherry et al. | |
| 9,066,138 B1 | 6/2015 | Kraiman et al. | |
| 9,167,278 B2 | 10/2015 | Sinha et al. | |
| 9,491,499 B2 | 11/2016 | Wagenaar et al. | |
| 9,613,042 B1 | 4/2017 | Joseph et al. | |
| 10,104,137 B2 | 10/2018 | Salomons | |
| 10,148,716 B1 | 12/2018 | Joseph et al. | |
| 2002/0159641 A1 | 10/2002 | Whitney et al. | |
| 2003/0005454 A1 | 1/2003 | Rodriguez et al. | |
| 2003/0033347 A1 | 2/2003 | Bolle et al. | |
| 2003/0045954 A1 | 3/2003 | Weare et al. | |
| 2003/0151621 A1 | 8/2003 | McEvilly et al. | |
| 2003/0195883 A1 | 10/2003 | Mojsilovic et al. | |
| 2003/0229900 A1 | 12/2003 | Reisman | |
| 2004/0022447 A1 | 2/2004 | Mukhopadhyay et al. | |
| 2004/0085339 A1 | 5/2004 | Divakaran et al. | |
| 2004/0221237 A1 | 11/2004 | Foote et al. | |
| 2004/0260786 A1 | 12/2004 | Barile | |
| 2005/0125368 A1 | 6/2005 | Akahori | |
| 2005/0251532 A1 | 11/2005 | Radhakrishnan et al. | |
| 2005/0262245 A1 | 11/2005 | Menon et al. | |
| 2005/0289347 A1 | 12/2005 | Ovadia | |
| 2006/0029253 A1 | 2/2006 | Pace | |
| 2006/0101060 A1 | 5/2006 | Li et al. | |
| 2006/0111801 A1 | 5/2006 | Weare et al. | |
| 2006/0271973 A1 | 11/2006 | Jerding et al. | |
| 2006/0279628 A1 | 12/2006 | Fleming | |
| 2006/0291690 A1 | 12/2006 | Roberts | |
| 2007/0025606 A1 | 2/2007 | Gholap et al. | |
| 2007/0128899 A1 | 6/2007 | Mayer | |
| 2007/0157231 A1 | 7/2007 | Eldering et al. | |
| 2007/0217676 A1 | 9/2007 | Grauman et al. | |
| 2007/0253594 A1 | 11/2007 | Lu et al. | |
| 2007/0282898 A1 | 12/2007 | Stark et al. | |
| 2008/0027931 A1 | 1/2008 | Lu et al. | |
| 2008/0040807 A1 | 2/2008 | Lu et al. | |
| 2008/0123976 A1 | 5/2008 | Coombs et al. | |
| 2008/0166057 A1 | 7/2008 | Nakajima | |
| 2008/0186413 A1 | 8/2008 | Someya et al. | |
| 2008/0271080 A1 | 10/2008 | Gossweiler et al. | |
| 2009/0074235 A1 | 3/2009 | Lahr et al. | |
| 2009/0113512 A1 | 4/2009 | Collet et al. | |
| 2009/0193473 A1 | 7/2009 | Moon et al. | |
| 2009/0204901 A1 | 8/2009 | Dharmaji et al. | |
| 2009/0324026 A1 | 12/2009 | Kletter | |
| 2010/0162330 A1 | 6/2010 | Herlein et al. | |
| 2010/0299438 A1 | 11/2010 | Zimmerman et al. | |
| 2011/0078551 A1 | 3/2011 | Zhang et al. | |
| 2011/0191692 A1 | 8/2011 | Walsh et al. | |
| 2011/0219035 A1 | 9/2011 | Korsunsky et al. | |
| 2011/0314493 A1 | 12/2011 | Lemire et al. | |
| 2012/0159337 A1 | 6/2012 | Travilla et al. | |
| 2012/0216121 A1 | 8/2012 | Lin et al. | |
| 2012/0240176 A1 | 9/2012 | Ma et al. | |
| 2012/0275597 A1 | 11/2012 | Knox et al. | |
| 2013/0163758 A1 | 6/2013 | Swaminathan et al. | |
| 2013/0195204 A1 | 8/2013 | Reznik et al. | |
| 2013/0291002 A1 | 10/2013 | Rothschild et al. | |
| 2013/0311780 A1 | 11/2013 | Besehanic | |
| 2014/0095890 A1 | 4/2014 | Mangalore et al. | |
| 2014/0115060 A1 | 4/2014 | Kim et al. | |
| 2014/0201334 A1 * | 7/2014 | Wang | H04L 65/4084 709/219 |
| 2014/0259051 A1 | 9/2014 | Strein et al. | |
| 2014/0280781 A1 | 9/2014 | Gregotski | |
| 2015/0058709 A1 | 2/2015 | Zaletel | |
| 2015/0074232 A1 | 3/2015 | Phillips et al. | |
| 2015/0113021 A1 | 4/2015 | Martin | |
| 2015/0172342 A1 | 6/2015 | Yin | |
| 2015/0208103 A1 * | 7/2015 | Guntur | H04N 19/46 725/61 |
| 2015/0346832 A1 | 12/2015 | Cole et al. | |
| 2015/0365622 A1 | 12/2015 | Ushiyama | |
| 2015/0365725 A1 | 12/2015 | Belyaev et al. | |
| 2015/0382042 A1 | 12/2015 | Wagenaar et al. | |
| 2016/0065946 A1 | 3/2016 | Cole et al. | |
| 2016/0080470 A1 | 3/2016 | Shanson | |
| 2016/0080810 A1 | 3/2016 | Dutta et al. | |
| 2016/0127260 A1 | 5/2016 | Gordon | |
| 2016/0127440 A1 | 5/2016 | Gordon | |
| 2016/0134910 A1 | 5/2016 | Davis et al. | |
| 2016/0149699 A1 | 5/2016 | Gauda | |
| 2016/0173961 A1 | 6/2016 | Coan et al. | |
| 2016/0198202 A1 | 7/2016 | Van Brandenburg et al. | |
| 2016/0224799 A1 | 8/2016 | Uzen et al. | |
| 2016/0227279 A1 | 8/2016 | Fang et al. | |
| 2016/0316233 A1 | 10/2016 | Ghadi et al. | |
| 2016/0337704 A1 | 11/2016 | Binder et al. | |
| 2017/0064400 A1 | 3/2017 | Riegel et al. | |
| 2017/0070758 A1 | 3/2017 | Phillips et al. | |
| 2017/0085933 A1 | 3/2017 | Czeck, Jr. et al. | |
| 2017/0150190 A1 | 5/2017 | Tarbox et al. | |
| 2017/0280181 A1 | 9/2017 | Ramaley | |
| 2017/0302753 A1 | 10/2017 | Larumbe et al. | |
| 2017/0308681 A1 | 10/2017 | Gould et al. | |
| 2017/0353516 A1 * | 12/2017 | Gordon | H04N 21/8456 |
| 2018/0063594 A1 | 3/2018 | Alexander et al. | |

FOREIGN PATENT DOCUMENTS

| | | |
|---|---|---|
| CN | 101689184 A | 3/2010 |
| CN | 103491457 A | 1/2014 |
| WO | 2006/122320 A1 | 11/2006 |
| WO | 2007/148290 | 12/2007 |

OTHER PUBLICATIONS

K. Mihcak and R. Venkatesan, "Blind Image Watermarking Via Derivation and Quantization of Robust Semi-Global Statistics", in IEEE International Conference on Acoustics, Speech and Signal Processing, 2002, (4 pages).

T. Lindeberg, "Feature Detection with Automatic Scale Selection", International Journal of Computer Vision, vol. 30, No. 2, 1998, pp. 1-51.

A. Andoni and P. Indyk, "Near-Optimal Hashing Algorithms for Approximate Nearest Neighbor in High Dimensions", in Proceed- (56) References Cited

OTHER PUBLICATIONS ings of the Symposium on Foundations of Computer Science, Jan. 2006, 10 pages.

A. Joly, O. Buisson and C. Frelicot, "Content-based Copy Retrieval using Distortion-based Probabilistic Similarity Search", IEEE Transactions on Multimedia, vol. 9, No. 2, p. 1-14, Feb. 2007.

J. Matas, O. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

Chinese Patent Application No. 201780011326.6, Office Action dated Mar. 9, 2020, 6 pages.

Chinese Patent Application No. 201780011328.5, Office Action dated Mar. 9, 2020, 8 pages.

* cited by examiner

```
#EXTM3U
#EXT-X-STREAM-INF:PROGRAM-ID=1,BANDWIDTH=1326000
http://12.34.56.789/server/play/directory/1326000/prog.m3u8
#EXT-X-STREAM-INF:PROGRAM-ID=1,BANDWIDTH=826000
http://12.34.56.789/server/play/directory/826000/prog.m3u8
#EXT-X-STREAM-INF:PROGRAM-ID=1,BANDWIDTH=1926000
http://12.34.56.789/server/play/directory/1926000/prog.m3u8
#EXT-X-STREAM-INF:PROGRAM-ID=1,BANDWIDTH=526000
http://12.34.56.789/server/play/directory/526000/prog.m3u8
```

FIG. 4

```
#EXTM3U
#EXT-X-TARGETDURATION:10
#EXT-X-VERSION:5
#EXT-X-MEDIA-SEQUENCE:1
#EXT-X-KEY:METHOD=SAMPLE-AES,URI="http://www.server.com/keys/ckey/kuxeFdrW8knwGPJ7zDIJ6Q==?anvack=nbcu_n
bcd_watchvod_ios_qa_c23d2809ee27249f2a757537da68d17d",IV=0xE0F48617C65F9D00ACC4847D0EDE94B5
#EXTINF:12.512,
http://www.videolocation.com/2288/15/04/24/2861607/227C1D636AE412B0A9CD90ECB9B899BD6A7631282DBF7E-1.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x24BCA9ACCEFA864BFEC75CBED36D47C8
#EXTINF:12.512,
http://www.videolocation.com/2288/15/04/24/2861607/227C1D636AE412B0A9CD90ECB9B899BD6A7631282DBF7E-2.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x6C29CA3D305C63ACEBB7A06EBE3573F7
#EXTINF:12.513,
http://www.videolocation.com/2288/15/04/24/2861607/227C1D636AE412B0A9CD90ECB9B899BD6A7631282DBF7E-3.ts
#EXT-X-KEY:METHOD=SAMPLE-AES,URI="http://www.server.com/keys/ckeys/kuxeFdrW8knwGPJ7zDIJ6Q==?anvack=nbcu_nbcd_wa
tchvod_ios_qa_c23d2809ee27249f2a757537da68d17d",IV=0xC8BDB892FDE40BD0C167C3F10B5D8699
#EXTINF:12.512,
http://www.videolocation.com/2288/15/04/24/2861607/227C1D636AE412B0A9CD90ECB9B899BD6A7631282DBF7E-4.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x3F9FCC1E55D85CFE32C18BA73992181D
#EXTINF:12.513,
http://www.videolocation.com/2288/15/04/24/2861607/227C1D636AE412B0A9CD90ECB9B899BD6A7631282DBF7E-5.ts
```

FIG. 5

METHOD AND APPARATUS FOR PROVIDING PEER-TO-PEER CONTENT DELIVERY

CROSS-REFERENCE TO RELATED APPLICATIONS

This application claims priority to U.S. provisional application Ser. No. 62/334,163, filed May 10, 2016 and titled Method and Apparatus for Providing Peer-to-Peer Content Delivery, the entire contents of which is incorporated herein by reference.

BACKGROUND

The subject matter disclosed herein relates to a method and apparatus for implementing peer to peer content delivery networks. More specifically, the subject matter pertains to a computer implemented method and apparatus for implementing peer to peer content delivery networks by delaying content delivery to facilitate client use of peer content delivery.

Video streaming allows video content to be delivered to a video player via the Internet. The video content is a video signal generated by a content provider for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided to multiple CDNs, the CDNs may be in different geographic locations, such as the West Coast, East Coast, or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

The streaming video content is commonly encrypted prior to transmission. A standard encryption protocol, such as the Advanced Encryption Standard (AES) may be used. During encoding of the video signal, the encoder may communicate with a key server to obtain an encryption key for the video content and encrypt the video signal as part of the encoding process. The encoder may include the location of the encryption key in the manifest file for the encoded video content and provide the manifest file to the CDN. The manifest file is delivered to the video player when the video content is requested. The video player reads the location of the encryption key from the manifest file, retrieves the encryption key, and decrypts the video content on the player prior to displaying the video content to the user.

Live encoders or video on demand encoders generate video segment files and upload them to origin servers or content delivery networks. Content delivery networks distribute these video segments to their edge servers when users submit requests to play the segments. However, it is common in live stream that every edge node and every user attempts to obtain the latest video segments often in temporal proximity. This causes a significant load on a content delivery network's edge servers and can create bottlenecks for video segment delivery.

What is needed is a method of implementing peer to peer content delivery networks to reduce the load on the content delivery networks and edge servers. What is further needed is such a method and apparatus for implementing peer to peer content delivery networks without extensive modification to video player software.

BRIEF DESCRIPTION

The subject matter disclosed herein describes a method for implementing peer to peer content delivery networks for video/media segment delivery by deliberately delaying a second client's live stream to serve that client from a first client that previously downloaded the video/media segment from a traditional content delivery network. The method may include assembling a list of available sources for live video segments and their locations based on previously received segment requests and providing customized manifests identifying those available sources from the list as potential peer content delivery networks.

In one embodiment of the disclosure, a computer implemented method embodied in a computer program stored in non-transient memory and executed by a computer processor for providing peer to peer content delivery of a live video stream includes receiving a first request for video content delivery from a first video player, receiving a second request for the video content delivery from a second video player, providing video content to the first video player from a content delivery network, and providing the video content to the second video player from the first video player.

According to another aspect of the disclosure, providing video content to the first video player from a content delivery network includes providing the video content based on a manifest file identifying the content delivery network as a delivery source. Further, providing video content to the second video player from the first video player includes providing the video content based on a manifest file identifying the first video player as a delivery source.

In another aspect of the disclosure, providing the video content to the second video player from the first video player is delayed for a defined time period. In one another aspect, the defined time period may be at least one video segment length+epsilon.

According to another embodiment of the disclosure, a computer implemented system for providing peer to peer content delivery includes a manifest server operative to generate a unique manifest file per request for a video file stored on a content delivery network. A first unique manifest file for a first video player is configured for providing video content to the first video player from a content delivery network and a second unique manifest file for a second video player is configured for providing video content to the second video player from the first video player.

According to another embodiment of the disclosure, a computer implemented method embodied in a computer program stored in non-transient memory and executed by a computer processor for providing peer to peer content delivery of a live video stream is described. The method includes receiving a first request for video content delivery from a first video player, providing video content to the first video player from a content delivery network, receiving a confirmation of receipt and an indication of availability from the first video player, receiving a second request for the video content delivery from a second video player, and providing the video content to the second video player from the first video player.

In one aspect of the disclosure, the confirmation of receipt and indication of availability are received in the defined time period and the video content is provided from the first video player based on the received confirmation and indication. In another aspect of the disclosure, the confirmation of receipt and indication of availability are received after the defined time period and the video content is provided from the content delivery network.

These and other objects, advantages, and features of the disclosure will become apparent to those skilled in the art from the detailed description and the accompanying drawings. It should be understood, however, that the detailed description and accompanying drawings, while indicating preferred embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 4 is a segment of a manifest file describing the bandwidths of the available streams for the streaming video content and the location of each stream, according to an exemplary embodiment;

FIG. 5 is a segment of a manifest file including a portion of a playlist where the video content is encrypted, according to an exemplary embodiment.

In describing the preferred embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
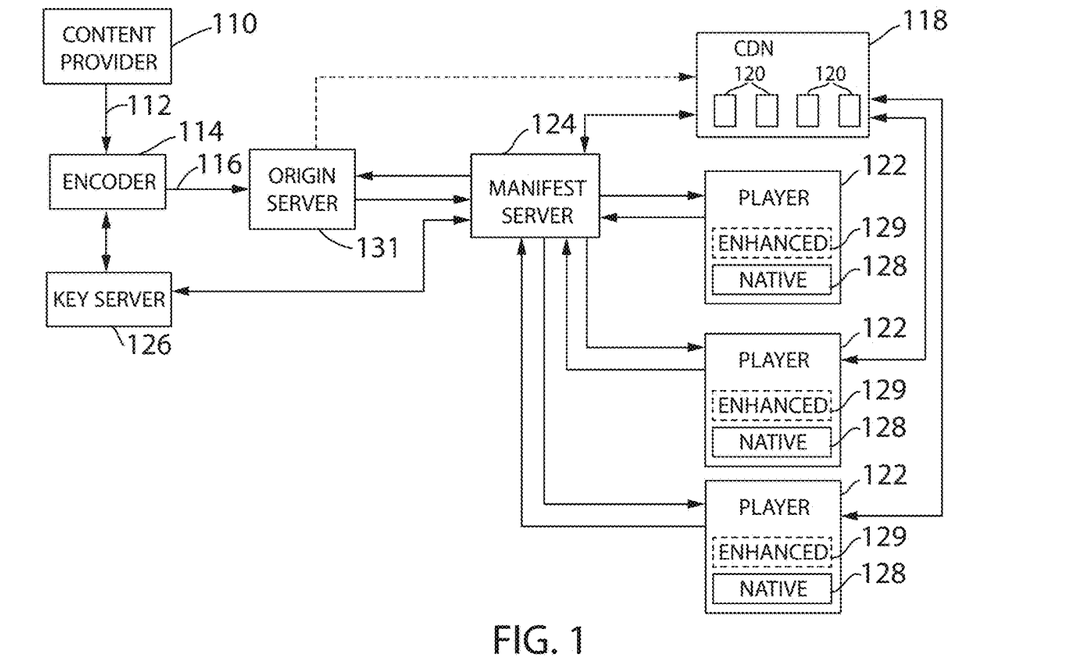
FIG. 1 is a block diagram representation of an exemplary environment for live video stream delivery from a content delivery network, according to an exemplary embodiment.

Turning initially to FIG. 1, an exemplary environment for providing live video stream delivery from a content delivery network using peer to peer content delivery is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like that may be used without deviating from the scope of the disclosure.

In addition to the segmented data stream, the encoder 114 generates a manifest file. The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 116 to a video origin server 131. The manifest files are updated periodically, for example every 10 seconds in one exemplary embodiment, and new segment files are uploaded to the video origin server 131. According to an alternative embodiment, the encoder 114 may be configured to upload manifest files and segment files directly to CDNs 118.

CDNs 118 periodically access video origin server 131 and upload video segments files such that the video segment files will be stored on one or more CDNs 118. The manifest file may include an address of each CDN such that playback may occur from any of the CDNs 118. Each CDN 118 includes a number of edge servers 120 which store the encoded video signal 116 and manifest file until playback of the video content is requested by a video player 122. Manifest files include two types of playlists, master playlists and rendition playlists.

As further illustrated in FIG. 1, the exemplary environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the device 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. As will be discussed in more detail below, when a user requests video content for playback on the video device 122, the native or enhanced video player module 129 communicates with a manifest server 124 rather than the CDN 118 to obtain the manifest files for video playback. The manifest server 124 manages the retrieval and delivery of the manifest file generated by the encoder 114 to provide the unique manifest file to each video player 122.

Figure 2:
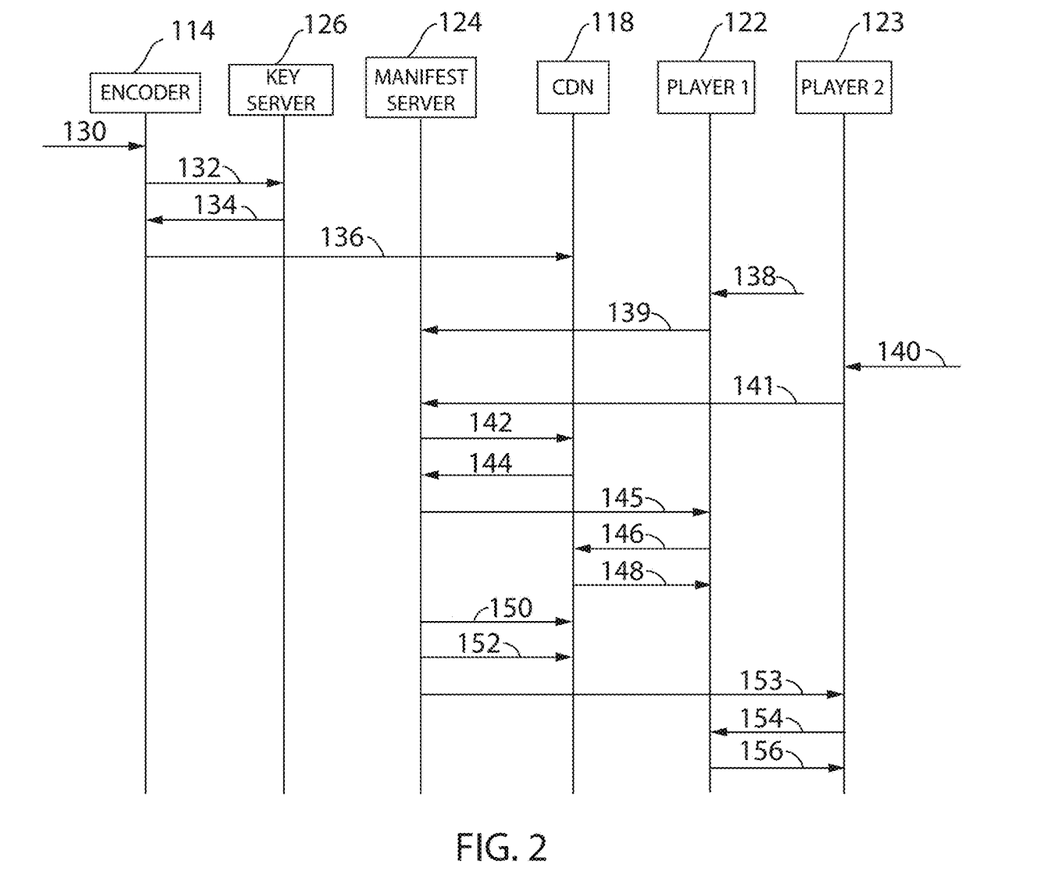
FIG. 2 is a flow diagram illustrating the implementing of live video stream delivery from a content delivery network using peer to peer content delivery, according to an exemplary embodiment.

Turning next to FIG. 2, a flowchart illustrating the operations for implementing live video stream delivery from a content delivery network using peer to peer content delivery is shown, according to the exemplary embodiment. At block 130, the encoder 114 receives the initial video signal 112. It is contemplated that this video signal 112 may be a prerecorded signal, such as an episode of a television show or a movie, or the video signal 112 may be a live stream, for example, of a sporting event, concert, or news feed. The encoder 114 converts the original video signal into a live streaming signal 116 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet.

After converting the video signal 112 into segments, the encoder 114 encrypts the video signals 112 to prevent unauthorized viewing of the video content. At block 132, the encoder 114 establishes communication with a key server 126 and requests a key to use for encrypting the segmented video signal 112. The key server 126 returns a key to the encoder 114 as shown in block 134. The key used to encrypt the segmented video signal 112 will be referred to herein as the content encryption key. The encoder 114 may use any suitable encryption protocol, such as the Advanced Encryption Standard (AES), to encrypt the segmented video signal using the content encryption key. The location of the key server and the encryption key used to encrypt the segmented video signal is included in a manifest file. The manifest file and the encrypted video signal are then transmitted to an origin server 131. Manifest files are uploaded periodically and new segment files uploaded to the origin server 131 for distribution to CDN 118. The manifest file and the encrypted video signal may alternatively be uploaded directly from the encoder 114 to one or more CDN 118 for storage in one of the edge servers 120, as shown in block 136. Although the video signal is described herein as being an encrypted video signal, the video signal is not required to be encrypted in alternative embodiments.

Figure 3:
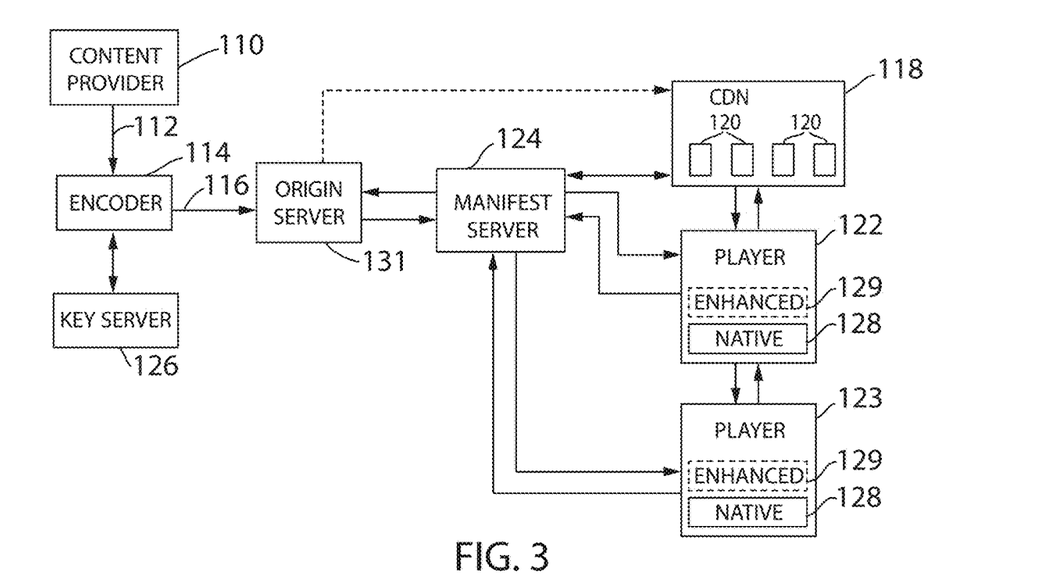
FIG. 3 is a block diagram representation of an exemplary environment for live video stream delivery from a content delivery network using peer to peer content delivery, according to an exemplary embodiment.

Referring now also to FIG. 3, a block diagram representation of an exemplary environment for live video stream delivery from a content delivery network using peer to peer content delivery is shown, according to an exemplary embodiment. At a block 138, a first user requests playback of a desired video segment through the video player 122. At block 140, a second user requests playback of the same desired video segment on a second video player 123. The video players 122, 123 may be any suitable electronic devices to receive the streaming signal 116 such as a desktop computer, a television, a laptop computer, a tablet, Wi-Fi enabled device connected to a video screen, or a mobile phone. As shown in blocks 139 and 141, respectively, the video players 122, 123 request a manifest file from the manifest server 124 that includes the information needed by the players in order to retrieve the information necessary to play the requested video content.

With reference also to FIGS. 4 and 5, segments of manifest files are illustrated that demonstrate a portion of the content that may be available in a manifest file. The manifest file is a text file and the particular content on each line of the text file is identified by the directive at the start of the line. For example, FIG. 4 identifies four different streams in the streaming signal 116 where each stream has a different bandwidth. The location of a playlist for each of the streams is also included in the manifest file. FIG. 5 is another manifest file which contains a portion of the playlist of an encrypted video segment. Each line begins with the location of the key server to decrypt the video segment, identifies a particular video segment between 1 and 5 (i.e., the "–1", "–2", etc. . . . prior to the .ts file extension), and provides the location of video segment in the CDN 118. The manifest file may include any information corresponding to the video stream, such as metadata information for the video stream.

When the video player 122 requests the manifest file from the manifest server 124 a first connection is established between the devices. A session identifier is also generated to identify the connection. The session identifier may be generated by the video player 122 or the manifest server 124. For purposes of illustration, it will be assumed that the session identifier is generated by the video player 122. The session identifier is transmitted to the manifest server 124 by the video player 122 when requesting a manifest file. The location of a playlist for each of the streams is also included in the manifest file. Each line begins with the location of the key server to decrypt the video segment, identifies a particular video segment between 1 and 5 (i.e., the "–1", "–2", etc. . . . prior to the .ts file extension), and provides the location of video segment in the CDN 118. The manifest server 124 then requests the manifest file from the CDN 118 at block 142. At block 144, the CDN 118 returns the manifest file to the manifest server 124.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN 118 and the content of the manifest file is the same for all users. However, because the manifest server 124 is providing a unique manifest file to each player, the manifest file may include identifying information of the video player 122, the user of the video player, or a combination thereof. Further, the manifest file may be modified to include content specific for the user. The manifest server 124 then transmits the manifest file to the video player 122, as shown at block 145.

The manifest file will have the address of the CDN 118 as containing the segmented video content. Therefore, the video player can then start retrieving the video content from the CDN 118. The video player 122 repeatedly requests the next segment in the playlist from the CDN 118 and the CDN returns the requested segment as shown by blocks 146 and 148. The native video player module 128 then decodes the content from the encrypted video segments and displays the requested video content to the user.

When the second video player 123 requests the manifest file from the manifest server 124 a second connection is established. Similar to the first connection, a session identifier is also generated to identify the second connection. The session identifier may be generated by the second video player 123 or the manifest server 124. For purposes of illustration, it will be assumed that the session identifier is generated by the second video player 123. The session identifier is transmitted to the manifest server 124 by the second video player 123 when requesting a manifest file.

However, in making this second connection, manifest server 124 has knowledge of the first connection already established with the video player 122. Video players 122 may advertise back to manifest server 124 (via video HTTP redirect) when the video segment is located and/or available in the video player 122. HTTP Redirect method allows the manifest server 124 to ensure that the video player 122 has received the previous segment as the video player 122 is requesting the next segment from CDN 118. As soon as this video segment is available, manifest server 124 can record the change to the video player 122's available segments and their statistics, source location, etc. This knowledge may be used to determine whether the video player 122 is a good candidate to be used as a potential peer content delivery source. Using the video player 122's IP address, manifest server 124 can determine the geolocation of the video player 122 which may be used to determine which second video players 123, for example having a similar geolocation, would benefit from being directed to video player 122 as a peer content delivery source.

The manifest server 124 then requests the manifest file from the CDN 118 at block 150 and customizes the manifest file for the second connection based on the knowledge regarding the first connection. The customized manifest file may be configured to identify the first player 122 as the location of the video segments allowing first player 122 to function as a peer to peer content delivery network. The manifest server 124 then transmits the customized manifest file to the second video player 123, as shown at block 153.

The customized manifest file will have the address of the video player 122 as containing the segmented video content. Therefore, the second video player 123 can then start retrieving the video content from the video player 122 as opposed to the CDN 118. The second video player 123 repeatedly requests the next segment in the playlist from the video player 122 and the video player 122 returns the requested segment as shown by blocks 154 and 156. The native video player module 128 then decodes the content from the encrypted video segments and displays the requested video content to the user.

The method and apparatus described above implements peer-to-peer CDN by deliberately delaying a client live stream to serve those clients from peer video segment sources. By leveraging customized manifest delivery, manifest server 124 may further be configured to switch between bad video sources (bad peer networks) to good video sources (good peer networks) based on heuristics related to devices and/or connections to devices. Further, a customized manifest may be configured to include a plurality of video players 122 as potential peer content delivery sources. The additional video players 122 and/or the original CDN 118 may be configured to function as either primary and/or failover stream sources.

According to an exemplary embodiment, manifest server 124 may be configured to track delivery of video segments to a large number of video players 122. Accordingly, manifest server 124 will have a record of which video players 122 have loaded which video segments and their availability such that manifest server 124 can identify these video players as potential peer content delivery sources.

In order to implement using video players 122 as peer content delivery sources, during delivery of live video, in which segment requests may be received from a large number of other video players 122 essentially simultaneously, it may be necessary to delay service to selected video players 122, essentially rendering these video players as second video players 123, which will receive content from the first video players 122. Second video players 123 may be been delayed for at least one video segment length (TS) plus a small time interval such as one (1) second.

Manifest server 124 can be configured to include a CDN 118 as a failover source for each rendition of a manifest file for second video players 123. Primary content sources may be the video players 122. However, if a second video player 123 cannot load the video segment from a first video player 122, the second video player 123 will try the failover rendition. Since the failover rendition is also delivered from manifest server 124 based on the request for failover provision of the video content, manifest server 124 may note the failure to determine whether the video player 122 acting as a peer source may have an issue in delivering video segments. These statistics will be tracked during live stream delivery to distinguish bad versus good peer content delivery sources (video players 122).

Advantageously, once a video player 122 has been identified as a live stream source, second video players 123 will start receiving video segments from the video player 122 as customized manifest files are distributed. Utilization of this system and method increases the number of available sources, many potentially having better download metrics that a nearest CDN. Further, utilization of the system and method distributes video segment delivery loads across all regions and using video player 122 resources that may be underutilized to deliver the live video streams.

Portions of the disclosed embodiment are described herein as being implemented on various physical devices, including, but not limited to, a plurality of video players 122, second video players 123, the manifest server 124, the key server 126, the encoder 114, origin server 131, or the edge server 120 within a CDN 118. It would be understood by one skilled in the art that these devices may include processing devices, such as a single microprocessor, multiple microprocessors, co-processors, application specific integrated circuits (ASICs), or other computing devices operating separately, in tandem, or a combination thereof. Further, each of these devices includes storage which may include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the technology disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

What is claimed is:

1. A computer implemented method for providing peer to peer content delivery and executed by a computer processor of a manifest server, comprising:
   receiving, at the manifest server, a first request for video content delivery of live-stream video content from a first video player, wherein the live-stream video content is associated with a first manifest file created by an encoder for the live-stream video content, and wherein the live-stream video content and the first manifest file are distributed to a content delivery network;
   upon receiving the request, communicating with the content delivery network to obtain, from the content delivery network, the first manifest file containing information for allowing the first video player to play the live-stream video content stored at the content delivery network;
   customizing, at the manifest server for the first video player, the first manifest file, the customized first manifest file identifying at least one of the first video player or a user of the first video player and also identifying the content delivery network for the live-stream video content delivery to cause the live-stream video content to be provided to the first video player from the content delivery network;
   receiving, at the manifest server, information on available segments of the live-stream video content at the first video player as the segments are being provided to the first video player from the content delivery network;
   receiving, at the manifest server, a second request for video content delivery of the live-stream video content from a second video player, which has not yet received the live-stream video content due to a delay introduced to facilitate a peer-to-peer content delivery of the live-stream video content;
   determining, by the manifest server and based on the information on the available segments of the live-stream video content at the first video player, whether the first video player is to be used as a content delivery source for the second request of the second video player; and
   upon determining that the first video player is to be used as the content delivery source for the second request of the second video player, providing, by the manifest server, a customized second manifest file that has been customized for the second video player, the customized second manifest file identifying the first video player for the video content delivery to cause the live-stream video content to be provided to the second video player from the first video player.

2. The method of claim 1, wherein providing the live-stream video content to the second video player from the first video player is delayed for a defined time period.

3. The method of claim 2, wherein the defined time period is at least one video segment length plus a processing interval.

4. The method of claim 3, wherein the processing interval is one second.

5. A system for providing peer to peer content delivery, the system comprising:
   a memory; and
   a computer processor, coupled to the memory, to:
   receive, at a manifest server, a first request for video content delivery of live-stream video content from a first video player, wherein the live-stream video content is associated with a first manifest file created by an encoder for the live-stream video content, and wherein the live-stream video content and the first manifest file are distributed to a content delivery network;
   upon receiving the request, communicate with the content delivery network to obtain, from the content delivery network, the first manifest file containing information for allowing the first video player to play the live-stream video content stored at the content delivery network;
   customize, at the manifest server for the first video player, the first manifest file, the customized first manifest file identifying at least one of the first video player or a user of the first video player and also identifying the content delivery network for the live-stream video content delivery to cause the live-stream video content to be provided to the first video player from the content delivery network;
   receive, at the manifest server, information on available segments of the live-stream video content at the first video player as the segments are being provided to the first video player from the content delivery network;
   receive, at the manifest server, a second request for video content delivery of the live-stream video content from a second video player, which has not yet received the live-stream video content due to a delay introduced to facilitate a peer-to-peer content delivery of the live-stream video content;
   determine, by the manifest server and based on the information on the available segments of the live-stream video content at the first video player, whether the first video player is to be used as a content delivery source for the second request of the second video player; and
   upon determining that the first video player is to be used as the content delivery source for the second request of the second video player, provide, by the manifest server, a customized second manifest file that has been customized for the second video player, the customized second manifest file identifying the first video player for the video content delivery to cause the live-stream video content to be provided to the second video player from the first video player.

6. The system of claim 5, wherein providing the live-stream video content to the second video player from the first video player is delayed for a defined time period.

7. The system of claim 6, wherein the defined time period is at least one video segment length plus a processing interval.

8. The system of claim 7, wherein the processing interval is one second.

9. A non-transitory computer-readable medium storing instructions, which when executed by a computer processor, cause the computer processor to perform operations comprising:

receiving, at a manifest server, a first request for video content delivery of live-stream video content from a first video player, wherein the live-stream video content is associated with a first manifest file created by an encoder for the live-stream video content, and wherein the live-stream video content and the first manifest file are distributed to a content delivery network;

upon receiving the request, communicating with the content delivery network to obtain, from the content delivery network, the first manifest file containing information for allowing the first video player to play the live-stream video content stored at the content delivery network;

customizing, at the manifest server for the first video player, the first manifest file, the customized first manifest file identifying at least one of the first video player or a user of the first video player and also identifying the content delivery network for the live-stream video content delivery to cause the live-stream video content to be provided to the first video player from the content delivery network;

receiving, at the manifest server, information on available segments of the live-stream video content at the first video player as the segments are being provided to the first video player from the content delivery network;

receiving, at the manifest server, a second request for video content delivery of the live-stream video content from a second video player, which has not yet received the live-stream video content due to a delay introduced to facilitate a peer-to-peer content delivery of the live-stream video content;

determining, by the manifest server and based on the information on the available segments of the live-stream video content at the first video player, whether the first video player is to be used as a content delivery source for the second request of the second video player; and     upon determining that the first video player is to be used as the content delivery source for the second request of the second video player, providing, by the manifest server, a customized second manifest file that has been customized for the second video player, the customized second manifest file identifying the first video player for the video content delivery to cause the live-stream video content to be provided to the second video player from the first video player.

* * * * *